Patented Feb. 17, 1931

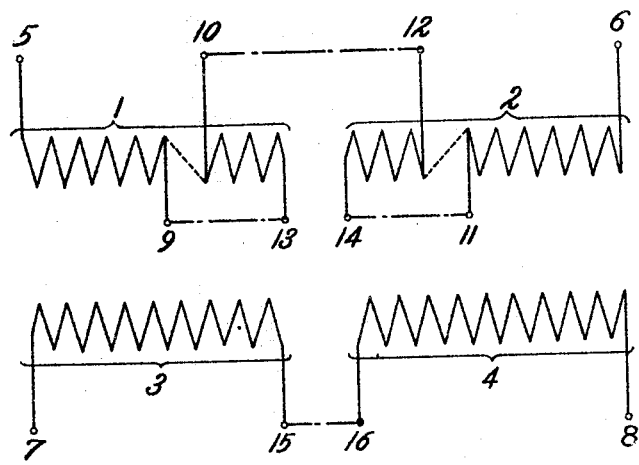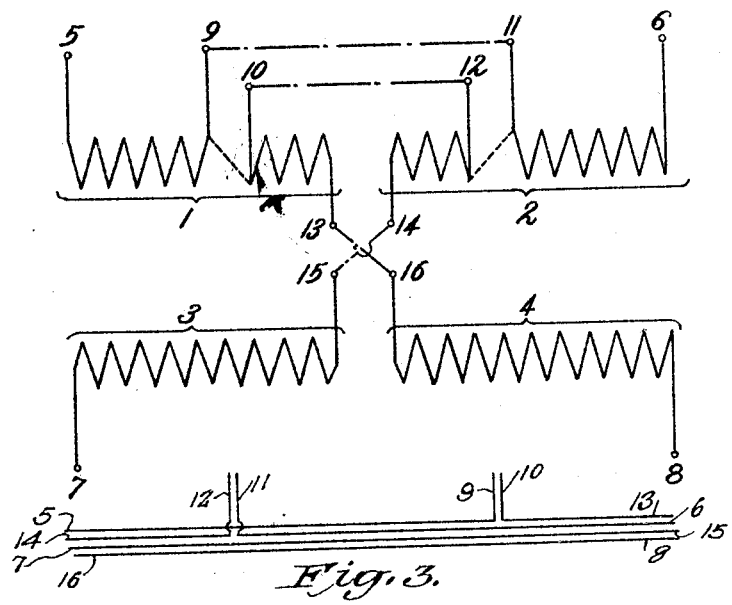

1,792,616

UNITED STATES PATENT OFFICE

GEORG TAUCHMANN, OF BERLIN-SCHONEBERG, AND ERICH REENTS, OF BERLIN-CHARLOTTENBURG, GERMANY, ASSIGNORS TO TELEPHON-APPARAT-FABRIK E. ZWIETUSCH & CO. G. M. B. H., OF CHARLOTTENBURG, GERMANY

TELEPHONE REPEATING COIL

Application filed January 6, 1928, Serial No. 244,807, and in Germany March 2, 1927.

The invention relates to the further development of the known repeating coils wherein the wires for forming the windings are, previous to their being wound, twisted or combined to form a single cable, and all the windings are wound on the core in the form of a symmetrical stranded cable. However, this method of winding only permits the construction of repeating coils having a ratio of 1:1. For the purpose of connecting circuits of different characteristics, for example for forming phantom circuits in telephony, repeating coils are required that must be completely symmetrical for any ratio. This requirement becomes still more stringent when the middle of the coil windings have to be earthed.

In the hereafter described method of winding repeating coils of any desired ratio this symmetry is obtained either by connecting in opposition or connecting together individual symmetrically located winding sections of the phantom winding known per se. According to the invention, the connecting in opposition or connecting together can be effected for any ratio. Therein the original method of forming the phantom winding, comprising the winding on simultaneously of four individual wires, remains unchanged, yet any desired ratio can be obtained, while preserving the symmetry of the repeating coil, by severing and connecting together the corresponding individual windings according to the first or the second method.

The drawing shows two methods of carrying out the invention.

Figure 1 shows a repeating coil having two sections of the primary winding connected in opposition to the remainder of the primary winding, while in Figure 2 the two sections of the primary winding are connected in series with the secondary winding. Figure 3 shows the conductors of which the windings are composed laid out preparatory to forming them into a cable.

In both cases the windings 1 and 2 are primaries and 3 and 4 are secondaries, for example they are combined to form a star stranded cable. The commencement of the cable windings are so fastened in the usual manner to the core (not shown), that they are freely accessible even after the winding material has been placed on the core.

Figure 3 shows the arrangement of the conductors composing the windings before they are formed into the cable. The conductors are twisted in the well known manner to form a stranded cable. This cable is then wound upon a suitable core to form the repeating coil. The numerals designating the wires in Figure 3 refer to the terminals to which these wires are connected after the cable is wound on the core. These terminals are shown in Figures 1 and 2.

The circuit in Figure 1 shows diagrammatically the method of connecting the individual sections of the windings in opposition for a repeating coil having a ratio greater than 1:1. Therein the winding sections 5—9, 10—13 and 6—11, 12—14, also 7—15 and 8—16 represent the wires of the phantom winding that are simultaneously wound on. Any required ratio can be obtained by disconnecting the primary winding at the symmetrically located points 9 and 11 and by connecting in opposition the correspondingly selected winding sections 10—13 and 12—14 to the winding sections 5—9 and 6—11. The connecting in opposition preferably is effected at such points of the repeating coil that give the greatest symmetry owing to the magnetic conditions being similar.

The circuit in Figure 2 shows diagrammatically how to connect together individual sections of windings for a similar repeating coil. Therein the winding sections 5—9, 10—13, 6—11 and 12—14, also 7—15, and 8—16 represent the simultaneously wound on wires of the phantom winding. By severing the primary windings at the symmetrically located points 9 and 11 and connecting together in series the windings 12—14 with 7—15 and the winding 10—13 with 8—16 and by connecting the winding sections 5—9 with 6—11, any desired ratio is obtained likewise, but this circuit arrangement avoids the copper losses caused by the inductively cancelled windings in Figure 1. The position of the winding sections on the repeating coil preferably is such that the symmetry itself is as great as possible.

What is claimed is:

1. In a repeating coil wherein the windings are wound simultaneously in the form of a single cable, a primary winding consisting of a number of symmetrically wound sections, a secondary winding, and means for connecting said sections in inductive opposition to obtain a desired ratio.

2. In a repeating coil, a primary winding consisting of a number of sections, a secondary winding, and means for disconnecting one primary section from the remainder of the primary winding and for connecting said section in series with said secondary winding to change the ratio.

3. In a repeating coil, a primary winding, a secondary winding, a third winding, and terminal facilities which enable said third winding to be connected in series with either of the other two windings as desired, thereby securing different ratios between the primary and secondary windings.

In witness whereof, I hereunto subscribe my name this 28th day of November, A. D. 1927.

GEORG TAUCHMANN.

In witness whereof, I hereunto subscribe my name this 28th day of November, A. D. 1927.

ERICH REENTS.